(12) United States Patent  (10) Patent No.: US 6,212,877 B1
Renggli  (45) Date of Patent: Apr. 10, 2001

(54) VECTORING RING SUPPORT AND ACTUATION MECHANISM FOR AXISYMMETRIC VECTORING NOZZLE WITH A UNIVERSAL JOINT

(75) Inventor: Bernard J. Renggli, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/148,926

(22) Filed: Sep. 4, 1998

(51) Int. Cl.$^7$ ............................................. F02K 1/12
(52) U.S. Cl. .................. 60/232; 239/265.35; 239/265.39
(58) Field of Search ............. 60/230, 232; 239/265.35, 239/265.37, 265.39, 265.41

(56) References Cited

U.S. PATENT DOCUMENTS

| | | | |
|---|---|---|---|
| 4,994,660 | * 2/1991 | Hauer | 60/232 |
| 5,174,502 | 12/1992 | Lippmeier et al. | 239/265.41 |
| 5,329,763 | 7/1994 | Ibarreche Mendia et al. | 60/232 |
| 5,542,607 | * 8/1996 | Jourdain et al. | 239/265.41 |
| 5,613,636 | 3/1997 | Zubillaga et al. | 239/265.35 |
| 5,794,850 | * 8/1998 | Gutierrez, Jr. | 239/127.1 |
| 5,820,024 | * 10/1998 | Ausdenmoore et al. | 239/265.35 |

* cited by examiner

Primary Examiner—Ted Kim
(74) Attorney, Agent, or Firm—Andrew C. Hess; Rodney M. Young

(57) ABSTRACT

A vectoring ring support and actuation apparatus is provided for transferring the side loads acting on a vectoring ring and generated by a gas turbine engine thrust vectoring nozzle to a relatively stationary portion of the engine and tilting the vectoring ring to vector the thrust of the nozzle. The apparatus includes an axially pivotable first link pivotably mounted on a relatively stationary first portion of the engine, an axially pivotable second link pivotably supported by and connected to the first link, and a vectoring ring connected to an aft end of the second link. An actuator is operably mounted between a relatively stationary second portion of the engine (spaced axially apart from the stationary first portion of the engine) and the second link to axially pivot the first link with respect. Preferably a first joint links the actuator to the second link and has at least first and second rotational degrees of freedom with corresponding first and second perpendicular axes of rotation. A second joint may be used to pivotably connect the second link to the first link and has one rotational degree of freedom and a third axis of rotation co-linear with one of the first and second perpendicular axes of rotation. The first joint is preferably a ball joint having three rotational degrees of freedom.

13 Claims, 4 Drawing Sheets

VECTORING RING SUPPORT AND ACTUATION MECHANISM FOR AXISYMMETRIC VECTORING NOZZLE WITH A UNIVERSAL JOINT

BACKGROUND OF THE INVENTION

Field of the Invention

This invention relates generally to axisymmetric variable throat thrust vectoring nozzles and, more particularly, to support and actuation apparatus of the vectoring ring that is used to pivot the nozzle flaps that vector the nozzle exhaust flow.

DISCUSSION OF THE BACKGROUND ART

For military aircraft applications, there exists a need to increase the maneuverability of the aircraft, both for air to air combat missions and complicated ground attack missions. Aircraft designers seek to replace or augment the use of conventional aerodynamic surfaces such as flaps and ailerons with vectorable nozzles which turn or vector the exhaust flow and thrust of the gas turbine engine powering the aircraft. U.S. Pat. No. 4,994,660, issued to Hauer, herein incorporated by reference, discloses an axisymmetric vectoring exhaust nozzle that provides a means for vectoring the thrust of an axisymmetric convergent/divergent nozzle by universally pivoting the divergent flaps of the nozzle in an asymmetric fashion or, in other words, pivoting the divergent flaps in radial and tangential directions with respect to the unvectored nozzle centerline. The flaps are pivoted by a vectoring ring which can be axially translated and gimballed or tilted about its horizontal and vertical axis (essentially have its attitude adjusted) through a limited range.

Vectored thrust produces tangential and radial loads referred to as side loads that are transmitted from the flaps by various load paths back to the engine casing through the actuators. These tremendous loads require heavy actuators to absorb the loads and, particularly, the bending moments exerted on the actuator shafts by thrust vectoring. U.S. Pat. No. 5,174,502, issued to Lippmeier et al., herein incorporated by reference, discloses a support for the vectoring ring that transfers at least a portion of the side loads acting generated by a gas turbine engine thrust vectoring nozzle to a relatively stationary portion of the engine. U.S. Pat. No. 5,174,502 discloses apparatus to minimize or eliminate the side loads transferred by the nozzle to the actuators, reduce or eliminate the bending moments that the actuators would be subject to due to the radial loads, and to minimize the size and weight of the nozzle actuators and hydraulic system used to power the actuators. The support includes pivotal links that provides for allowing two degree of freedom (2 DOF) pivoting or gimballing motion and axial translation of the vectoring ring. One of the embodiments has a dual link support means with a rectangular first link pivotally attached to the engine casing by a hinge. The first link is pivotally connected to a second link which in turn is universally hinged to the vectoring ring by a 3 DOF or spherical joint.

SUMMARY OF THE INVENTION

Briefly, in accordance with one aspect of the present invention, a vectoring ring support and actuation apparatus is provided for transferring the side loads acting on a vectoring ring and generated by a gas turbine engine thrust vectoring nozzle to a relatively stationary portion of the engine and tilting the vectoring ring to vector the thrust of the nozzle. The apparatus includes an axially pivotable first link pivotably mounted on a relatively stationary first portion of the engine, an is axially pivotable second link pivotably supported by and connected to the first link, and a vectoring ring connected to an aft end of the second link. An actuator is operably mounted between a relatively stationary second portion of the engine spaced axially apart from the stationary first portion of the engine and the second link to axially pivot the first link with respect to the first portion of the engine. The apparatus preferably includes a first joint linking the actuator to the second link and the first joint has at least first and second rotational degrees of freedom with corresponding first and second perpendicular axes of rotation. A second joint that may be used to pivotably connect the second link to the first link has one rotational degree of freedom and a third axis of rotation co-axial with one of the first and second perpendicular axes of rotation. The first joint is preferably a ball joint having three rotational degrees of freedom and a third axis of rotation mutually perpendicular to the first and second perpendicular axes of rotation.

In the drawings as hereinafter described, a preferred embodiment is depicted; however, various other modifications and alternate constructions can be made thereto without departing from the true spirit and scope of the invention.

ADVANTAGES

Among the advantages provided by the apparatus of the present invention is the combined ability to reduce or even eliminate the side loads transferred to the vectoring ring actuators and the bending moments that the actuators and their arms would be subjected to with the ability to actuate the vectoring ring. The present invention also reduces the overall size of the structure needed to perform both of these functions as compared to designs in the prior art. The present invention combines the actuation and support mechanisms for the vectoring ring rather than splitting up the functions of ring support and ring actuation into two separate interface points on the vectoring ring and accomplishes the two functions of ring actuation and support with a single mechanism making the apparatus less complicated and structurally improved over that of the prior art.

The present invention eliminates a set of clevises on the vectoring ring which would be used to fasten the actuators to the ring, thus, simplifying the ring and reducing its cost and weight. Placing the vectoring ring actuators in front of and in line with the support and actuation apparatus of the present invention opens up space in the circumferential direction around the nozzle engine casing, making it easier to find room for other nozzle hardware.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
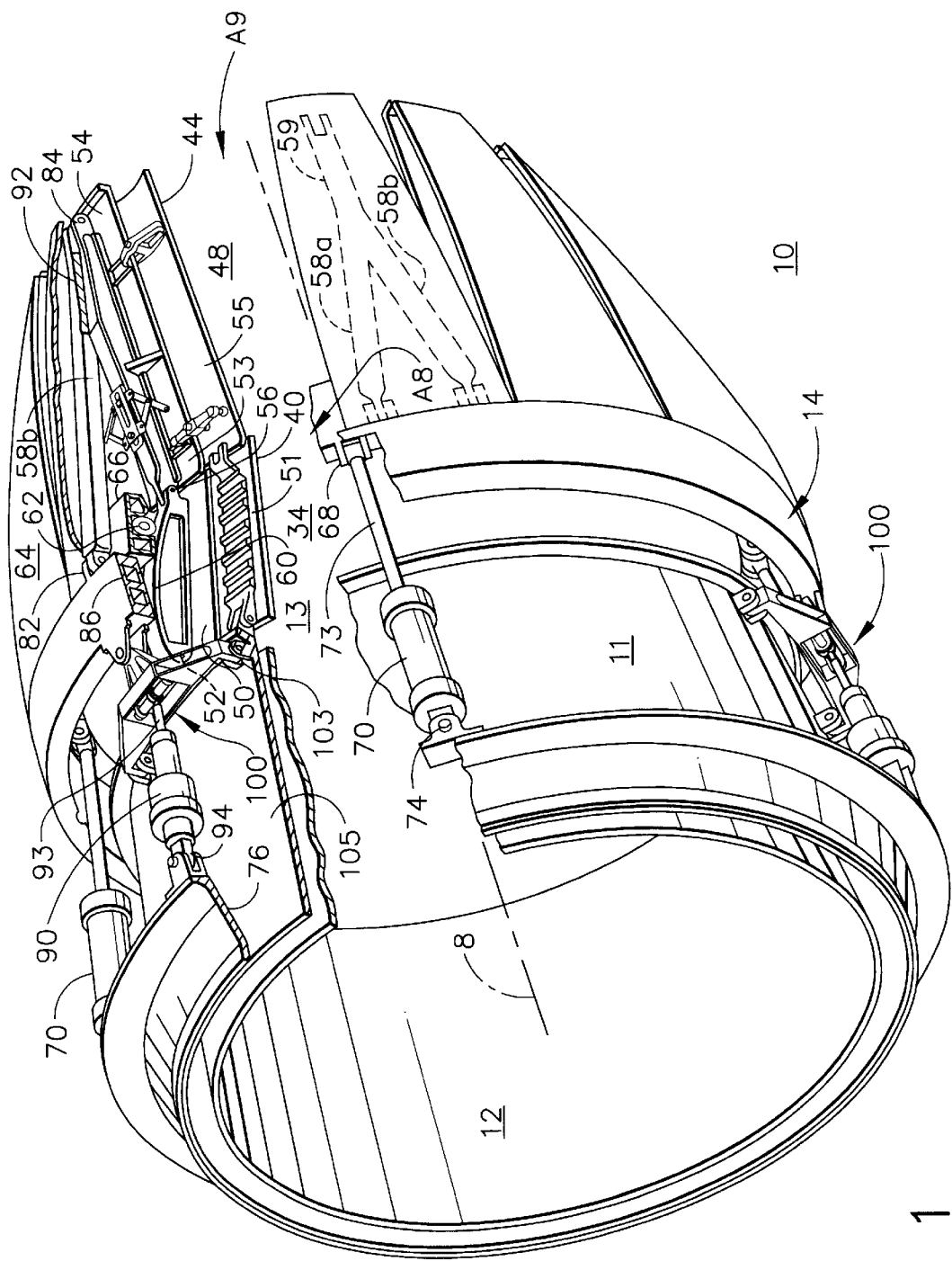
FIG. 1 is a partial cut away perspective view illustration of a gas turbine engine axisymmetric vectoring exhaust nozzle with a vectoring ring support and actuation apparatus in accordance with the preferred embodiment of the present invention.

The present invention is illustrated in FIG. 1 as a vectoring ring support and actuation apparatus 100 illustrated as part of an exhaust section 10 of an aircraft gas turbine engine comprising in serial flow relationship a fixed area duct or engine casing 11, including an afterburner liner 12, and a variable area downstream section 13 having an axisymmetric vectoring nozzle 14 of the convergent divergent type as referenced previously in the Hauer patent.

Referring to FIG. 1, nozzle 14 comprises in serial flow relationship a convergent section 34, a throat 40 and a divergent section 48. The convergent section 34 includes a plurality of convergent or primary flaps 50 circumferentially disposed about engine centerline 8 with overlapping primary seals 51 disposed between and in sealing engagement with the radially inward facing surface of circumferentially adjacent primary flaps 50. Primary flap 50 is pivotally attached at its forward end to casing 11 by first pivotal or clevis joint 52. A divergent or secondary flap 54 is pivotally attached at its forward end 53 to the aft end of primary flap 50 by a universal two degree of freedom (2 DOF) joint such as a flap ball joint 56 generally at an axial position in the nozzle 14 which coincides with throat 40. Secondary flaps 54 are generally circumferentially disposed about engine centerline 8 with overlapping divergent or secondary seals 55 disposed between and in sealing engagement with the radially inward facing surface of circumferentially adjacent secondary flaps 54. Throat 40 has associated with it a throat area conventionally referred to as A8 and the nozzle exit 44 is generally at the end of secondary flaps 54 and has an exit area associated with it conventionally referred to as A9.

A plurality of rollers 62 are disposed in a primary ring structure 66 which in turn is translated forward and aft by a plurality of primary actuators 70, of which there are four in the preferred embodiment. The variable throat area A8 is controlled by the action of cam roller 62 on the cam surface 60 which is formed on the back of primary flap 50. During operation, the high pressure of the exhaust gases within the nozzle force primary flaps 50 and secondary flaps 54 radially outward, thus, keeping cam surface 60 in contact with cam roller 62. A conical annular actuator support 76 is mounted at its narrow forward end to engine casing 11 and primary actuator 70 is pivotally connected to the wide aft end of the conical actuator support 76 by a universal ball joint 74. Primary actuator 70 has an actuator rod 73 which in turn is connected to primary ring structure 66 by a spherical joint 68.

A plurality of vectoring actuators 90, of which there are three in the preferred embodiment, are equi-angularly disposed circumferentially around casing 11 and mounted to conical actuator support 76 by universal ball joints 94 in a similar manner as actuators 70.

A vectoring ring 86 is used to control the positioning or pivoting of secondary flaps 54 to provide thrust vectoring. Secondary flaps 54 are pivotally connected to primary flaps 50 by the flap ball joint 56 and is pivotally controlled in a multi-degree of freedom manner by a plurality of respective Y-frames 59 having control arms 58a and 58b that operably connect vectoring ring 86 to secondary flap 54. outer flaps 64 are at least partially supported by Y-frames 59 and provide a clean and smooth aerodynamic shape along the exterior of the nozzle.

Control arms 58a and 58b are connected to vectoring ring 86 by 3 DOF spherical joints 82 and to the aft end of secondary flap 54 by a spherical joint 84. This linkage is operable to translate an attitude change of vectoring ring 86 into a multi-degree of freedom pivoting change or orbital movement of secondary flap 54 whereby each secondary flap may be pivoted through a different angle. The use of spherical joints 82 to attach control arms 58a and 58b provides clevis type pivoting of Y-frame 59 while preventing any twisting loads that may be imparted to either control arms 58a or 58b from being transferred back to vectoring ring 86. Backbone 92 provides a mount for secondary flap 54 and support for joint 84 and flap ball joint 56 at its two ends.

Figure 2:
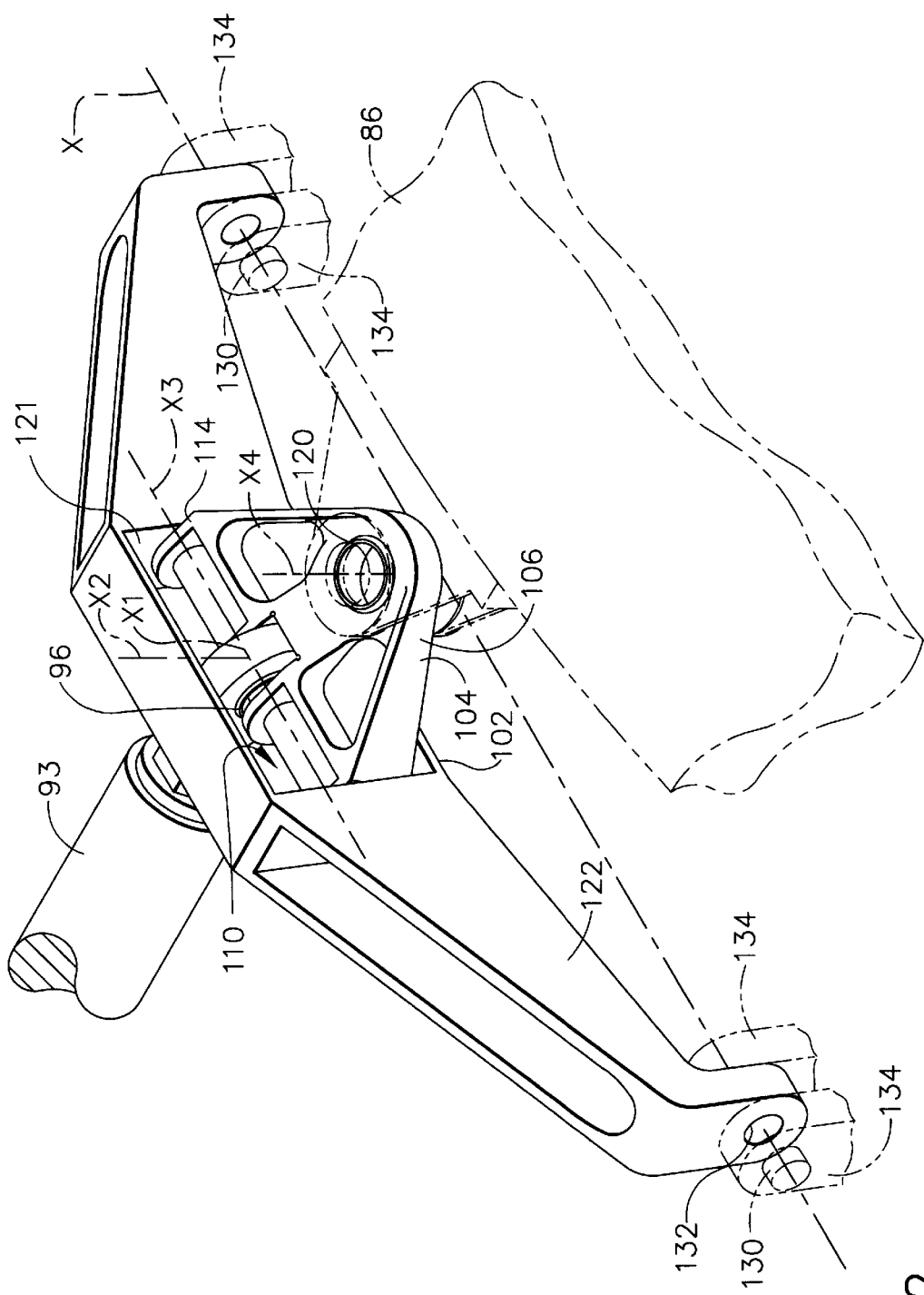
FIG. 2 is an enlarged view of the preferred embodiment of the vectoring ring support and actuation apparatus shown in FIG. 1.
Figure 3:
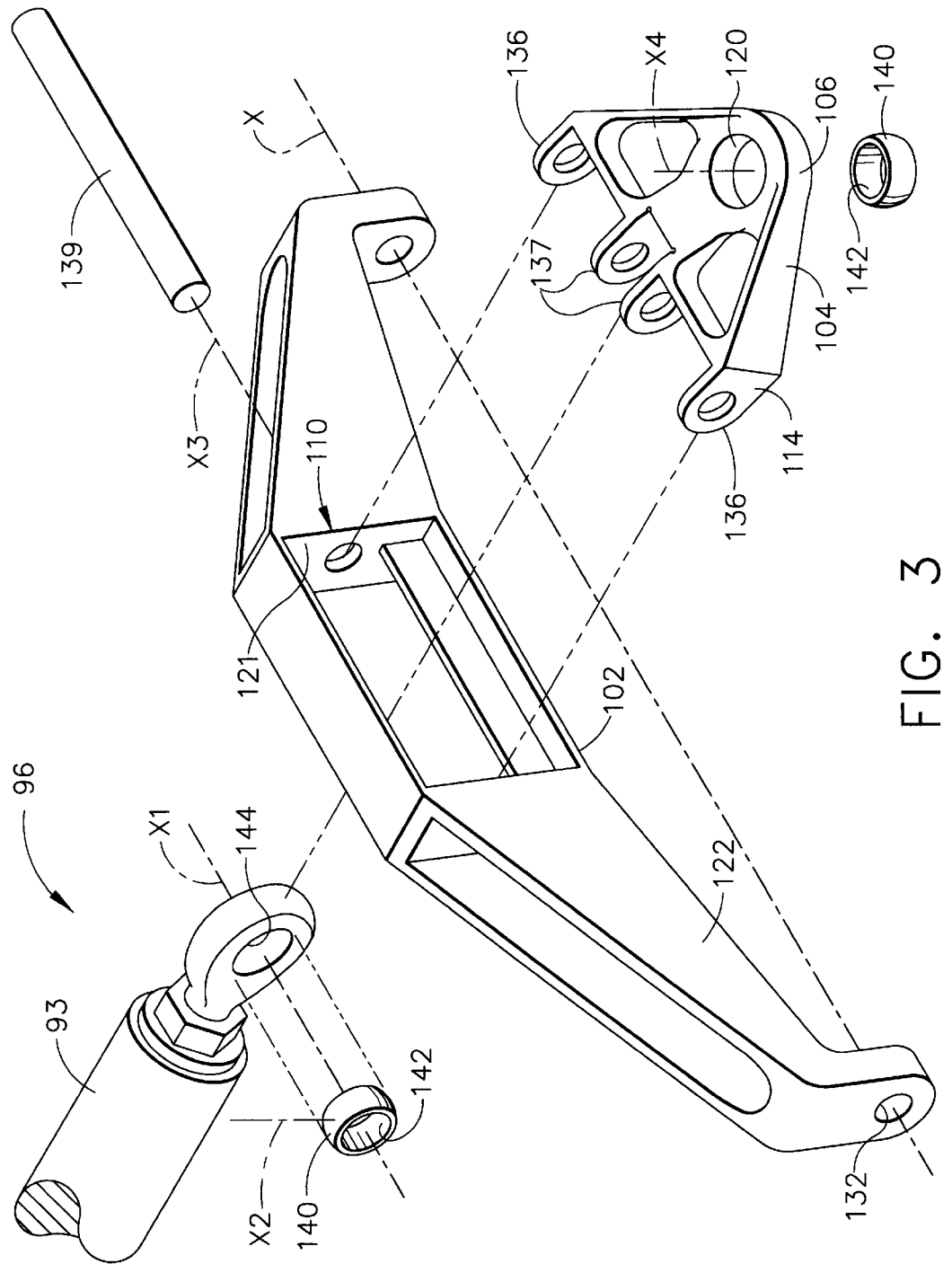
FIG. 3 is an exploded view of the vectoring ring support and actuation apparatus shown in FIG. 2.

FIGS. 2 and 3 more clearly illustrate how the vectoring ring 86 is supported and actuated by three of the axially adjustable vectoring ring support and actuation apparatus 100 connected at the aft end of a vectoring actuator rod 93 of the vectoring actuators 90 by a first joint 96 having at least first and second rotational degrees of freedom. The preferred embodiment has a spherical or ball joint with three rotational degrees of freedom as illustrated in FIGS. 2 and 3. Each of the apparatuses 100 has an axially pivotable first link 102 pivotably mounted on a relatively stationary first portion 103 of the engine such as the engine casing 11. An axially pivotable second link 104 is pivotably supported by and connected to the first link 102 and the vectoring ring 86 is connected to an aft end 106 of the second link 104. The vectoring actuator 90 is mounted between a relatively stationary second portion 105 of the engine, such as the conical actuator support 76 which is spaced axially forward of the throat 40 of the nozzle 14 of the engine, and the second link 104 so as to be operable to axially pivot the first link 102 with respect to the relatively stationary engine casing 11.

The first joint 96 has at least first and second rotational degrees of freedom about corresponding first and second perpendicular axes of rotation X1 and X2 and connects the actuator rod 93 to a forward end 114 of the second link 104. A second joint 110 pivotably connects the second link 104 to the first link 102 and preferably is a clevis type joint having only one rotational degree of freedom with a third axis of rotation X3 co-liner with the first axes of rotation X1. The vectoring ring 86 is connected to the aft end 106 of the second link 104 by a third joint 120 which is a universal preferably ball joint having three rotational degrees of freedom and a corresponding fourth axis of rotation X4 axially spaced aft from and perpendicular to the third axis of rotation X3 and generally parallel to the second axis of rotation X2.

The first link 102 has a central box structure 121 to support said second link 104 and equal length arms 122 extend away from the box structure in a direction parallel to the third axis of rotation X3. Depending from each of the arms 122 is a rotational lugs 130 having a first pin bore 132 by which it is rotatably pinned between two corresponding stationary lugs 134 extending up from the engine casing 11.

The first link 102 is thus pivotable about a pin axis X passing though the first pin bores 132 of the rotational lugs 130. The pin axis is radially spaced apart from and circumferentially transverse to the centerline 8.

The second link 104 is pivotably supported by and connected to the first link 102 within the box structure 121. A plurality of second clevis lugs 136 at the forward end 114 of the second link 104 are rotatably pinned within the box structure 121 to the first link 102 by a first pin 139. Pin 139 also rotatably pins a uniball 140 through a ball bore 142 of the first joint 96 and to an inner couple 137 of the plurality of second clevis lugs 136. The uniball 140 is rotatably disposed with a spherical cavity 144 of the uniball 140 to provide the three rotational degrees of freedom to the first joint 96.

The vectoring ring 86 is connected to an aft end 106 of the second link 104 by the ball type vectoring ring third joint 120. This provides for vectoring ring 86 to be axially translated and tilted about centerline 8 in order to control its attitude. The three vectoring actuators 90 and their corresponding three vectoring ring support and actuation apparatuses 100 are equi-angularly disposed circumferentially about casing 11, that allows vectoring ring 86 to be axially translated and gimballed by vectoring actuators 90.

The axially pivoting first and second links 102 and 104, respectively, allows the actuator 90 to both tilt and translate the vectoring ring 86 by simultaneously or differentially extending the three actuators 90. The axially pivoting first and second links 102 and 104, respectively, also eliminates the transfer of twisting loads that may otherwise be imparted to the actuator and absorbs circumferential loads from vectoring ring 86 so that the three apparatuses 100 act together to prevent sideways movement of the vectoring ring. Not only does the axially pivoting first and second links 102 and 104, respectively, allow attitude adjustment or gimballing and translating of the vectoring ring 86 they also permit axial translation of the vectoring ring to provide control of exit area 44.

Figure 4:
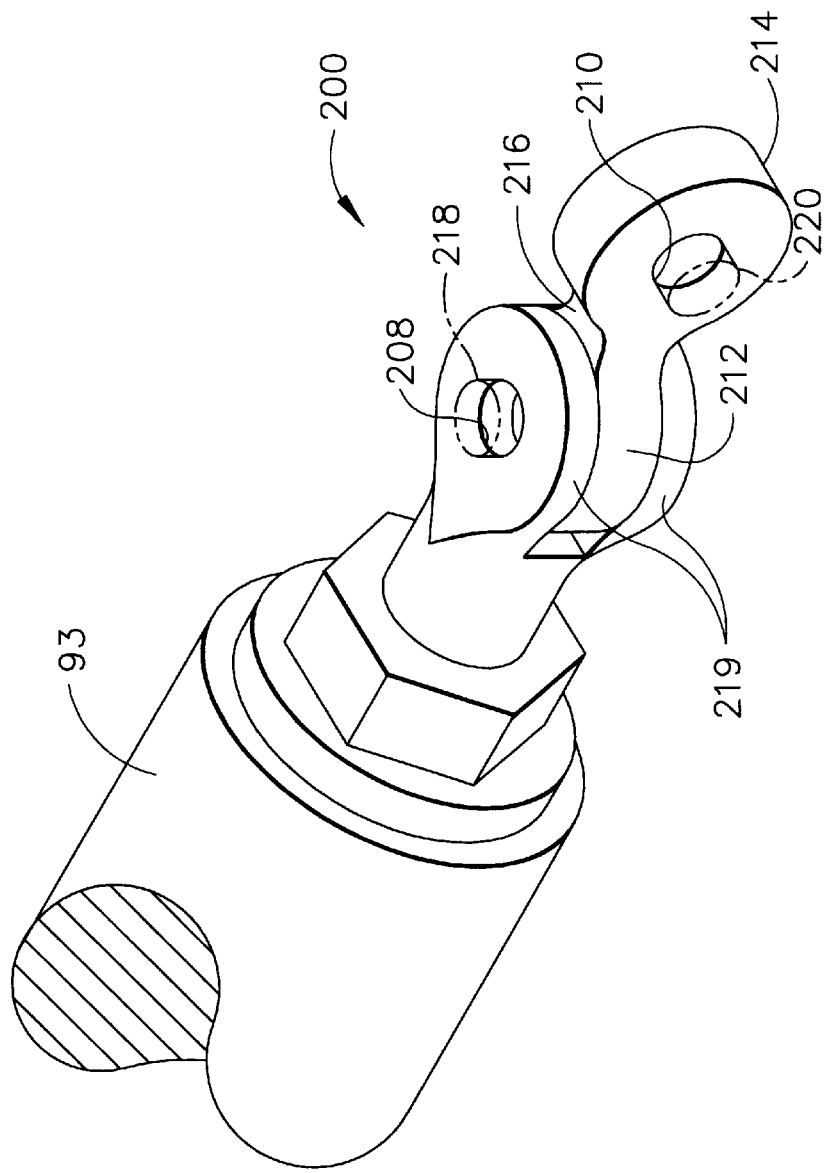
FIG. 4 is a perspective view illustration of an alternative embodiment of the vectoring ring support and actuation apparatus shown in FIG. 1.

An alternative to the first joint 96 is illustrated in FIG. 4 in the form of a universal dual clevis joint 200 connecting the second link 104 to the vectoring actuator rod 93. The universal dual clevis joint 200 has mutually perpendicular first and second clevis bores 208 and 210, respectively, in corresponding first and second opposite ends 212 and 214, respectively, of a dual clevis lug 216. A first clevis pin 218 connects dual lugs 219 on the actuator rod 93 to the dual clevis lug 216 through the first clevis bores 208. A second clevis pin 220 (same as the first pin 139 illustrated in FIGS. 2 and 3) connects the second link 104 to the dual clevis lug 216 through the second clevis bore 210.

While the preferred embodiment of our invention has been described fully in order to explain its principles, it is understood that various modifications or alterations may be made to the preferred embodiment without departing from the scope of the invention as set forth in the appended claims.

What is claimed is:

1. A vectoring ring actuation and support apparatus for use in an aircraft gas turbine engine vectoring nozzle, said apparatus comprising:
    an axially pivotable first link pivotably mounted on a relatively stationary first portion of the engine disposed about a nozzle centerline,
    said first link pivotable about a first axis that is radially spaced apart from and transverse to said centerline,
    an axially pivotable second link pivotably supported by and connected to said first link,
    a universal third joint connecting a vectoring ring to an aft end of said second link,
    an actuator operably mounted between a relatively stationary second portion of the engine and said second link and connected to said second link by a first joint so as to be effective to pivot said first link about said first axis, and
    said second portion spaced axially apart and forward of said first portion of the engine.

2. An apparatus as claimed in claim 1 further comprising said first joint connecting said actuator to said second link having at least first and second rotational degrees of freedom with corresponding first and second perpendicular axes of rotation.

3. An apparatus as claimed in claim 2 further comprising a second joint pivotably connecting said second link to said first link, said second joint having one rotational degree of freedom and a third axis of rotation co-linear with one of said first and second perpendicular axes of rotation.

4. An apparatus as claimed in claim 3 wherein said first joint is a ball joint having three rotational degrees of freedom and three corresponding mutually perpendicular axes of rotation wherein two of said three corresponding mutually perpendicular axes of rotation are said first and second perpendicular axes of rotation.

5. An apparatus as claimed in claim 4 wherein said first link comprises:
    a central box structure within which said second link is pivotably mounted,
    equal length arms extending away from said box structure in a direction parallel to said third axis of rotation,
    depending from each of said arms is a rotational lug having a first pin bore with which said rotational lug is rotatably pinned between two corresponding stationary lugs extending up from the first portion of the engine.

6. An apparatus as claimed in claim 3 wherein said first joint comprises:
    a universal dual clevis joint having mutually perpendicular first and second clevis bores in corresponding first and second opposite ends of a dual clevis lug,
    a first clevis pin connecting said actuator to said dual clevis lug through said first clevis bore, and
    a second clevis pin connecting said second link to said dual clevis lug through said second clevis bore.

7. An apparatus as claimed in claim 6 wherein said first link comprises:
    a central box structure within which said second link is pivotably mounted,
    equal length arms extending away from said box structure in a direction parallel to said third axis of rotation,
    depending from each of said arms is a rotational lug having a first pin bore with which said rotational lug is rotatably pinned between two corresponding stationary lugs extending up from the first portion of the engine.

8. An aircraft gas turbine engine axisymmetric vectoring exhaust nozzle comprising:
    a vectoring ring operably linked to a plurality of pivotal flaps by universal joints having at least two rotational degrees of freedom and circumferentially disposed about a nozzle centerline and bounding an exhaust gas flowpath in the nozzle;
    at least one vectoring ring actuation and support apparatus for use in an aircraft gas turbine engine vectoring nozzle, said apparatus comprising;
    an axially pivotable first link pivotably mounted on a relatively stationary first portion of the engine disposed about said nozzle centerline,
    said first link pivotable about a first axis that is radially spaced apart from and transverse to said centerline,
    an axially pivotable second link pivotably supported by and connected to said first link,
    a universal third joint for connecting the vectoring ring to an aft end of said second link, an actuator operably mounted between a relatively stationary second portion of the engine and said second link, and said actuator operably connected to said second link and effective to pivot said first link about said first axis, and said second portion spaced axially apart and forward of said first portion of the engine.

9. A nozzle as claimed in claim 8 wherein said apparatus further comprises a first joint linking said actuator to said second link and having at least first and second rotational degrees of freedom with corresponding first and second perpendicular axes of rotation.

10. A nozzle as claimed in claim 9 wherein said apparatus further comprises a second joint pivotably connecting said second link to said first link, said second joint having one rotational degree of freedom and a third axis of rotation co-linear with one of said first and second perpendicular axes of rotation.

11. A nozzle as claimed in claim 10 wherein said first joint is a ball joint having three rotational degrees of freedom and three corresponding mutually perpendicular axes of rotation wherein two of said three corresponding mutually perpendicular axes of rotation are said first and second perpendicular axes of rotation.

12. A nozzle as claimed in claim 11 wherein said first link comprises:

a central box structure within which said second link is pivotably mounted, equal length arms extending away from said box structure in a direction parallel to said third axis of rotation, depending from each of said arms is a rotational lug having a first pin bore with which said rotational lug is rotatably pinned between two corresponding stationary lugs extending up from the first portion of the engine.

13. A nozzle as claimed in claim 10 wherein said first joint comprises:

a universal dual clevis joint having mutually perpendicular first and second clevis bores in corresponding first and second opposite ends of a dual clevis lug, a first clevis pin connecting said actuator to said dual clevis lug through said first clevis bore, and a second clevis pin connecting said second link to said dual levis lug through said second clevis bore.

* * * * *